US 11,235,855 B2

(12) United States Patent
Liversage et al.

(10) Patent No.: US 11,235,855 B2
(45) Date of Patent: Feb. 1, 2022

(54) AERODYNAMIC SEALS

(71) Applicant: Airbus Operations Limited, Bristol (GB)

(72) Inventors: David Liversage, Bristol (GB); Darren Crew, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 545 days.

(21) Appl. No.: 16/161,356

(22) Filed: Oct. 16, 2018

(65) Prior Publication Data
US 2019/0118933 A1 Apr. 25, 2019

(30) Foreign Application Priority Data
Oct. 19, 2017 (GB) ...................................... 1717191

(51) Int. Cl.
B64C 9/02 (2006.01)
B64C 3/26 (2006.01)

(52) U.S. Cl.
CPC . *B64C 9/02* (2013.01); *B64C 3/26* (2013.01)

(58) Field of Classification Search
CPC ............. B64C 1/12; B64C 3/26; B64C 11/20
See application file for complete search history.

(56) References Cited

U.S. PATENT DOCUMENTS

| 9,821,538 | B1* | 11/2017 | Harris | B64C 1/12 |
| 10,695,958 | B2* | 6/2020 | Thomas | B64C 3/20 |
| 10,738,814 | B2* | 8/2020 | Bradley | F16B 11/006 |
| 10,871,232 | B2* | 12/2020 | Laverne | B64C 3/26 |
| 2010/0170994 | A1* | 7/2010 | Burns | B63C 7/00 244/130 |
| 2013/0037655 | A1 | 2/2013 | Bradley et al. | |
| 2016/0017999 | A1 | 1/2016 | Boyd et al. | |
| 2017/0008616 | A1 | 1/2017 | Davies et al. | |

FOREIGN PATENT DOCUMENTS

ES 2 524 651 12/2014

OTHER PUBLICATIONS

Combined Search and Examination Report for GB1717191.9 dated Mar. 22, 2018, 8 pages.

* cited by examiner

*Primary Examiner* — Philip J Bonzell
*Assistant Examiner* — Michael B. Kreiner
(74) *Attorney, Agent, or Firm* — Nixon & Vanderhye P.C.

(57) ABSTRACT

An aerodynamic structure comprising an aerodynamic surface. The aerodynamic surface is formed by a first part of the aerodynamic structure; a second part of the aerodynamic structure; and a sealed gap between the first part and the second part. The sealed gap contains a sealant material and a support material.

20 Claims, 6 Drawing Sheets

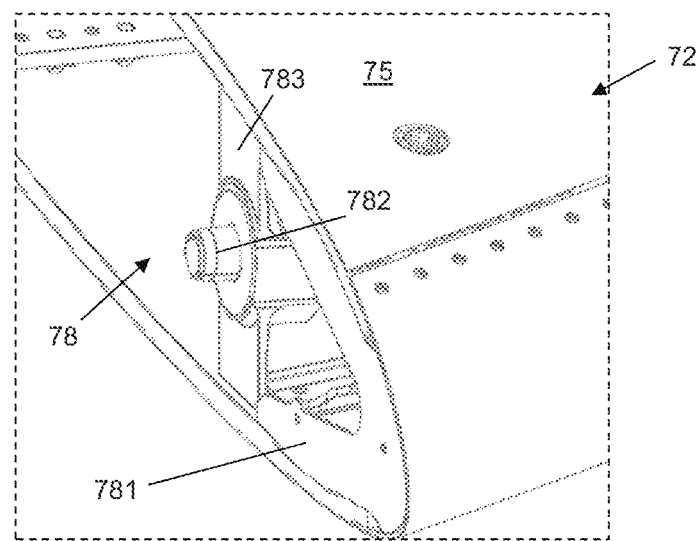
Fig. 7
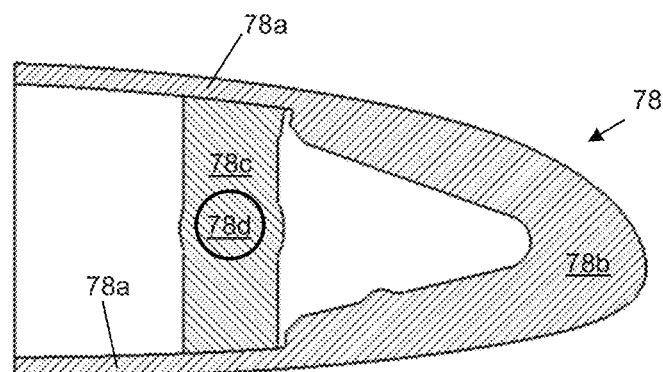
Fig. 8 (i)
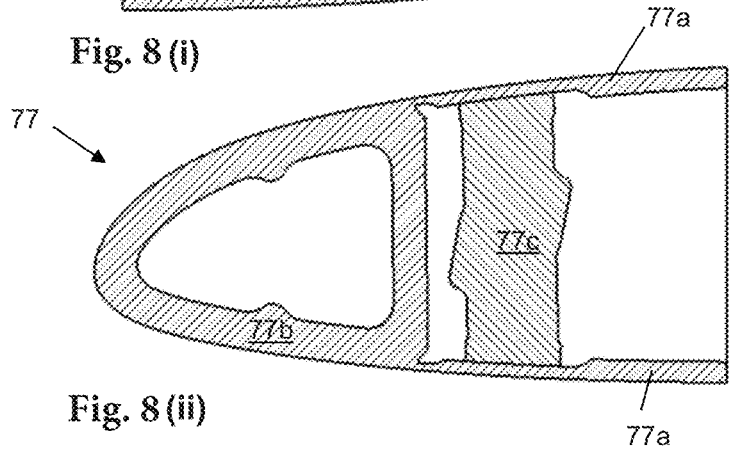
Fig. 8 (ii)

AERODYNAMIC SEALS

RELATED APPLICATION

This application claims priority to United Kingdom Patent Application GB 1717191.9, filed Oct. 19, 2017, the entirety of which is incorporated by reference.

TECHNICAL FIELD

The present invention relates to an aerodynamic structure comprising an aerodynamic surface formed by a first part, a second part, and a sealed gap between the first and second parts. The present invention also relates to a method of manufacturing such an aerodynamic structure.

BACKGROUND

The external aerodynamic surface of an aircraft wing is typically formed by joining together separately formed panels. Particularly if these panels are formed from a composite material, such as carbon fibre reinforced plastic (CFRP), a gap will be present between the adjacent aerodynamic surfaces due to tolerances in the panel manufacturing process. Such a gap will cause turbulence when the aircraft is in use, decreasing its aerodynamic efficiency.

A conventional method of sealing such gaps is to manually tool into place a liquid sealant material to form a smooth fillet. The sealant material then cures into a relatively solid state to form a continuous aerodynamic surface comprising the adjacent panels and the gap.

SUMMARY

A first aspect of the present invention provides an aerodynamic structure comprising an aerodynamic surface. The aerodynamic surface is formed by a first part of the aerodynamic structure; a second part of the aerodynamic structure; and a sealed gap between the first part and the second part. The sealed gap contains a sealant material and a support material.

Optionally, the support material is compressible. Optionally, the support material comprises an open-cell foam.

Optionally, the sealant material is curable, such that it can be applied to the aerodynamic structure in a relatively fluid state and subsequently cured into a relatively solid state.

Optionally, the gap is defined by a first interface surface on the first part and a second interface surface on the second part. Optionally, each of the first interface surface and the second interface surface is substantially perpendicular to the aerodynamic surface. Optionally, at least one of the first interface surface and the second interface surface comprises a recess.

Optionally, a top (or outermost) part of the gap immediately adjacent the aerodynamic surface contains the sealant material, and a lower (or inner) part of the gap which is relatively further from the aerodynamic surface contains the support material. Optionally, an intermediate part of the gap disposed between the top (or outermost) part and the lower (or inner) part contains the sealant material and the support material.

Optionally, the aerodynamic surface forms a substantially closed loop and each interface surface is a cross section of the closed loop.

Optionally, the support material is present on a peripheral region of each interface surface which is relatively nearer the aerodynamic surface, and is not present on a central region of each interface surface which is relatively further from the aerodynamic surface.

Optionally, the support material is present on a leading edge region and on a trailing edge region of each interface surface, but is not present on a region between the leading edge region and the trailing edge region.

Optionally, at least one of the first interface surface and the second interface surface comprises a projection, and the support material comprises a hole, recess, or compressible region configured to accommodate the projection.

Optionally, one of the first interface surface and the second interface surface comprises a formation extending into or out of the interface surface, and the support material is configured to engage the formation such that an interference fit is created between the support material and the formation.

Optionally, the support material is sufficiently stiff that it is able to maintain its shape and configuration without external support.

Optionally, the structure comprises an aerofoil and the first and second parts comprise adjacent sections of the aerofoil.

Optionally the structure comprises an aircraft wing, one of the first and second parts comprises a tip part of the wing, and the other of the first and second parts comprises a winglet.

There is also provided, according to a second aspect of the invention, an aircraft comprising the aerodynamic structure of the first aspect.

There is also provided, according to a third aspect of the invention, a method of manufacturing an aerodynamic structure comprising an aerodynamic surface. The method comprises:

(i) providing a first part of the aerodynamic structure, which is to form a first region of the aerodynamic surface;

(ii) providing a second part of the aerodynamic structure, which is to form a second region of the aerodynamic surface;

(iii) providing a support material on an interface surface of the first part which is configured to be positioned adjacent to a corresponding interface surface of the second part, and/or on an interface surface of the second part which is configured to be positioned adjacent to a corresponding interface surface of the first part;

(iv) joining the first part and the second part such that a gap exists between a peripheral edge of the first interface surface and a peripheral edge of the second interface surface, and the support material is in contact with, or is nearly in contact with, both the first interface surface and the second interface surface; and (v) introducing uncured sealant material into the gap to create the aerodynamic surface.

Optionally, the support material limits the penetration of the sealant material into the gap during the step of introducing uncured sealant material into the gap. Optionally, the uncured sealant material penetrates the structure of the support material.

Optionally, the aerodynamic structure is an aerodynamic structure according to the first aspect.

BRIEF DESCRIPTION OF THE DRAWINGS

Embodiments of the invention will now be described, by way of example only, with reference to the accompanying drawings, in which:

FIGS. 5(i) and 5(ii) show schematic views of an interface surface of the example second part of FIG. 4, and a corresponding interface surface of an example first part of the same aerodynamic structure;

FIGS. 6(i) and 6(ii) show schematic perspective views, from the inboard and outboard sides, of an example support material for the aerodynamic structure of FIGS. 5 and 6;

FIG. 7 is a partial perspective view of an example second part of a leading edge aerodynamic structure;

FIGS. 8(i) and 8(ii) show schematic views of an interface surface of the example second part of FIG. 7, and a corresponding interface surface of an example first part of the same aerodynamic structure;

DETAILED DESCRIPTION

The examples described below relate to an aerodynamic structure comprising an aerodynamic surface. In each of the examples the aerodynamic surface is formed by a first part of the aerodynamic structure, a second part of the aerodynamic structure, and a sealed gap between the first part and the second part. The sealed gap contains a sealant material and a support material.

As described above, aerodynamic structures such as aircraft wings or the like are often manufactured by arranging adjacent panels or components of the structure with a small gap between them, at least at the aerodynamic surface, and then introducing a liquid sealing material to form a continuous aerodynamic surface comprising the adjacent components and the gap. Depending on the configuration of the adjacent components, the gap may extend for a significant distance beneath the aerodynamic surface. In some examples, the gap may extend for the full depth of the component, between an upper aerodynamic surface and a lower aerodynamic surface of the component. Moreover, the gap is defined by interface surfaces of the adjacent components which may not necessarily be configured to match each other, resulting in voids or chambers within the aerodynamic chamber which are accessible via the gap. Thus, in some cases when liquid sealant is introduced into a gap between adjacent parts of an aerodynamic structure, it could flow straight through the structure and/or into relatively large voids within the structure, requiring an excessively large amount of sealant to be used. The examples described herein advantageously enable the flow of a liquid sealant into a gap in an aerodynamic structure to be limited or constrained, minimizing the amount of sealant that is required. Some examples may also advantageously improve adherence of the sealant material to the aerodynamic structure.

Figure 1:
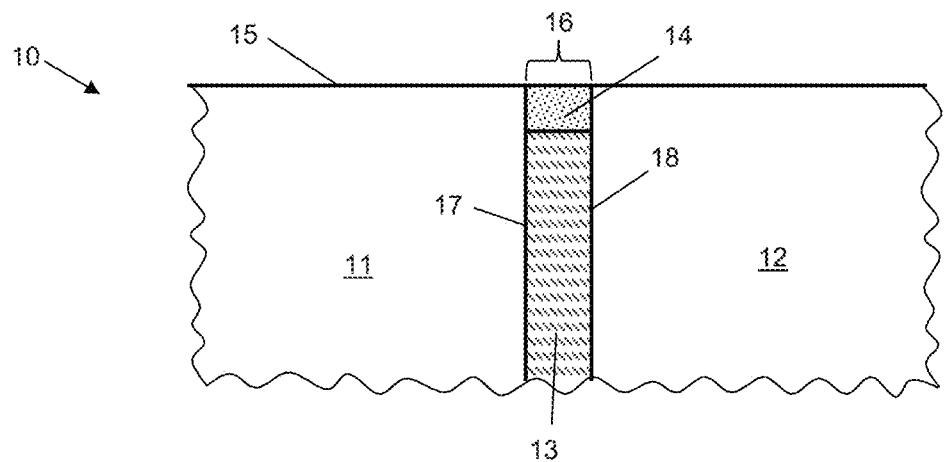
FIG. 1 is a schematic cross-section through part of an example aerodynamic structure according to the invention.

FIG. 1 shows a general example of an aerodynamic structure 10 according to the invention. The aerodynamic structure comprises an aerodynamic surface 15. The aerodynamic surface 15 is formed by a first part 11 of the aerodynamic structure, a second part 12 of the aerodynamic structure; and a sealed gap 16 between the first part and the second part. The sealed gap 16 contains a sealant material 14 and a support material 13. The aerodynamic structure may, in principle, be any type of aerodynamic structure. The invention may be particularly advantageous in the context of an aircraft aerodynamic structure, such as an aerofoil, where the first and second parts of the aerodynamic structure are adjacent sections of the aerofoil. Particular examples in which the aerodynamic structure is an aerofoil (in particular, an aircraft wing) are discussed below with reference to FIGS. 4 to 9.

The gap is defined by a first interface surface 17 on the first part 11 and a second interface surface 18 on the second part 12. The term "interface surface" should be understood to refer to a surface of a part which is configured or arranged to interface with a corresponding surface of another part, when those parts are joined in the completed aerodynamic structure. "Interface with" should not be taken to imply any engagement or connection between the interface surfaces—they may simply be positioned adjacent each other. Similarly, although the shape and configuration of corresponding interface surfaces will generally be complementary, at least over part of the area of the interface surfaces, this is not required by the term "interface surface".

In the illustrated example, each of the first interface surface 17 and the second interface surface 18 is substantially perpendicular to the aerodynamic surface 15, at least in a peripheral region of the gap immediately adjacent the aerodynamic surface 15. Other examples are possible in which the interface surfaces 17, 18 are not perpendicular, although they will be angled with respect to the aerodynamic surface 15 in order to define the gap 16. In some examples (e.g. examples in which the aerodynamic structure 10 is a wing, the first part 11 is a wing tip, and the second part 12 is a winglet) the interface surface extends between two aerodynamic surfaces of the aerodynamic structure (e.g. an upper aerodynamic surface and lower aerodynamic surface). However, this need not be the case for all examples. In some examples (e.g. examples in which the aerodynamic structure 10 is a wing) the aerodynamic surface 45 forms a substantially closed loop and each interface surface 17, 18 is a cross section of the closed loop.

The interface surfaces 17, 18 need not be flat or planar, and indeed for most applications will not be flat or planar across the whole area of a given interface surface. For example, one or both interface surfaces 17, 18 may comprise one or more recesses and/or one or more projections.

Figure 3:
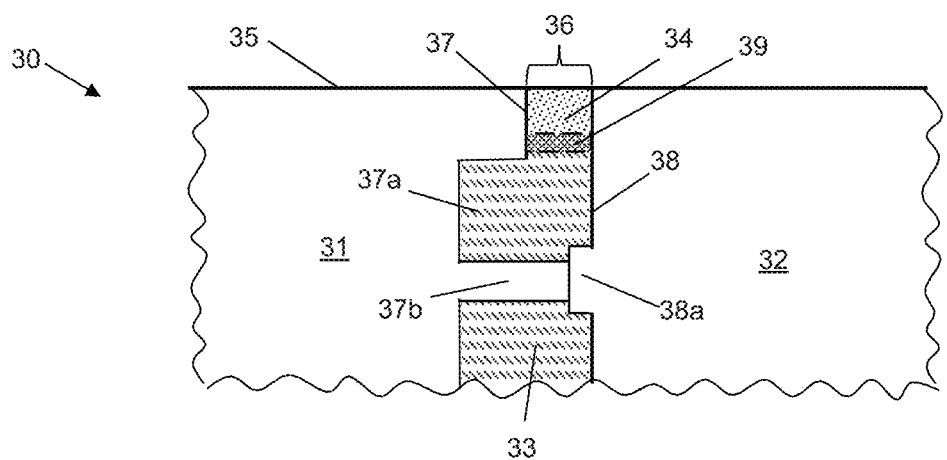
FIG. 3 is a schematic cross-section through part of a further example aerodynamic structure according to the invention.

FIG. 3 illustrates an example aerodynamic structure 30 having an aerodynamic surface 35 (which may have the same or similar features as the aerodynamic structure 10 and aerodynamic surface 15 of FIG. 1) in which a first interface surface 37 on a first part 31 of the aerodynamic structure 30 comprises a recess 37a and a projection 37b, and a second interface surface 38 on a second part 32 of the aerodynamic structure 30 comprises a projection 38a. The protrusion 37b extends from the base of the recess 37a, and engages with the protrusion 38a. For example, the protrusions 37b and 38a may be connector structures which function to attach the second part 32 to the first part 31. The interface surfaces 37 and 38 define a gap 36 which has a nominal width in an outermost region immediately adjacent the aerodynamic surface 35, and a larger width in a region further from the aerodynamic surface 35. The width of the gap varies in the plane of the page (the spanwise direction, in examples in which the aerodynamic structure 30 is an aerofoil), and may also vary in the perpendicular horizontal plane which extends into the page (the chordwise direction, in examples in which the aerodynamic structure 30 is an aerofoil). In principle, any number and combination of projections and recesses may be provided on an interface surface.

Returning to FIG. 1, a top (outermost) part of the gap 16 immediately adjacent the aerodynamic surface 15 contains the sealant material 14 and a lower (inner) part of the gap 16 which is relatively further from the aerodynamic surface 15 contains the support material 13. In some examples an intermediate part of the gap disposed between the top part and the lower part contains the sealant material and the support material. FIG. 3 illustrates such an example. In the gap 36 of the FIG. 3 aerodynamic structure 30, sealant material 34 is present in an outermost (top) part of the gap 36, support material 33 is present in a lower (inner) part of the gap 36 and a combination 39 of sealant material and support material is present in an intermediate part of the gap 36 between the top part and the lower part. A combination of sealant material and support material may be created, for example, by the sealant material penetrating or impregnating the structure of the support material.

The support material 13, 33 may be compressible. A compressible support material may be advantageous for various reasons, including to accommodate variations in the width of the gap due to manufacturing/assembly tolerances, and/or to ensure contact between the support material and the interface surfaces. In a particular example, manufacturing tolerances could require a support material having a width (thickness) of 8 mm to be compressed to a width approaching 0 mm. The support material 13, 33 may deform readily under light pressure. For some applications, e.g. aircraft wing applications, the amount of pressure required to deform the support material should not be too high (with the exact amount depending on the particular application), e.g. in order to avoid producing structural stresses which may affect the performance of the aerodynamic structure, and/or to avoid causing difficulties in joining the first part and the second part.

The support material 13, 33 is present on a peripheral region of each interface surface which is relatively nearer the aerodynamic surface 15, 35. In some examples the support material 13, 33 is not present on a central region of each interface surface which is relatively further from the aerodynamic surface 15, 35. Such a central region may comprise, for example, a hole to accommodate a projection extending from the interface surface, or may serve to reduce the amount of support material present in the gap, e.g. to reduce costs. However; the support material 13, 33 is not present on a region of each interface surface immediately adjacent the aerodynamic surface 15, 35. This is to allow space for sufficient sealant material to be present in the gap to create a smooth aerodynamic surface, and/or to adhere sufficiently to the aerodynamic structure.

The support material may be in the form of a support material structure. Such a support material structure may be sufficiently stiff that it is able to maintain its shape and configuration without external support. A desired stiffness of a support material structure may be achieved, for example, by tailoring the shape of the structure, the material properties of the support material, providing a support mechanism as part of the structure, or the like. In some examples one of the first interface surface and the second interface surface comprises a formation extending into or out of the interface surface, and the support material structure is configured to engage the formation such that an interference fit is created between the support material structure and the formation.

A support material structure may comprise a single unitary piece of support material, or it may be formed from multiple pieces of support material. Multiple pieces of support material may be joined to form a single support material structure, or they may be provided on one or both of the interface surfaces as separate support material structures. The configuration and manufacturing process selected for a given support material may be selected in dependence on the requirements of the particular application. For example, a support material structure may be configured to fill a particular gap between corresponding interface surfaces of two parts to be joined. In some examples in which at least one of the first interface surface and the second interface surface comprises a projection, the support material structure comprises a hole, recess, or compressible region configured to accommodate the projection.

Figure 2:
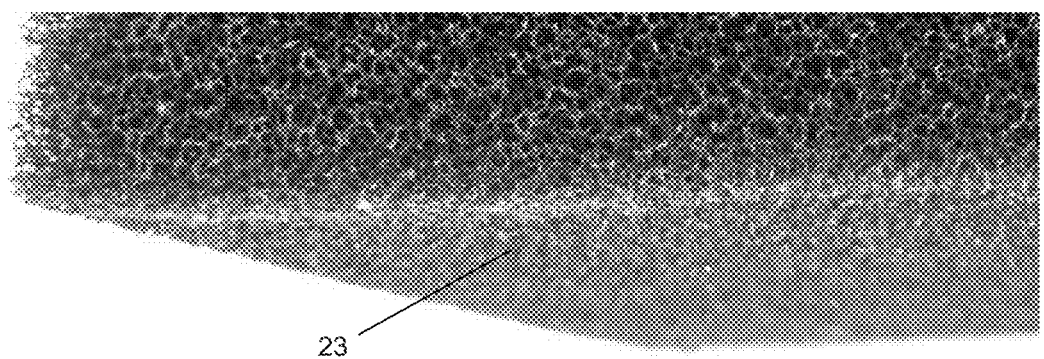
FIG. 2 is a partial perspective view of a portion of an example support material for the aerodynamic structure of FIG. 1.

In some examples the support material comprises a foam material. A foam support material may comprise and open-cell foam material, e.g. to enable the sealant material to impregnate the structure of the support material. FIG. 2 shows an example support material 23, suitable for use as the support material 13 or the support material 33, which comprises an open-cell foam material. Foam of this type can easily be cut or machined into a desired three-dimensional shape (e.g. to create a support material structure) using, for example, a band-saw, knife, hot wire, CNC machining, or the like. For example, a foam support material structure may be configured to match the configuration of a particular gap between corresponding interface surfaces of two parts to be joined.

The sealant material 13, 33 may comprise any sealant material suitable for sealing a gap in an aerodynamic surface. In some examples the sealant material is curable, such that it can be applied to the aerodynamic structure in a relatively fluid state and subsequently cured into a relatively solid state. Various such curable sealant materials for sealing gaps in aerodynamic surfaces are known, and could be used as the sealant material 13, 33.

Figure 4:
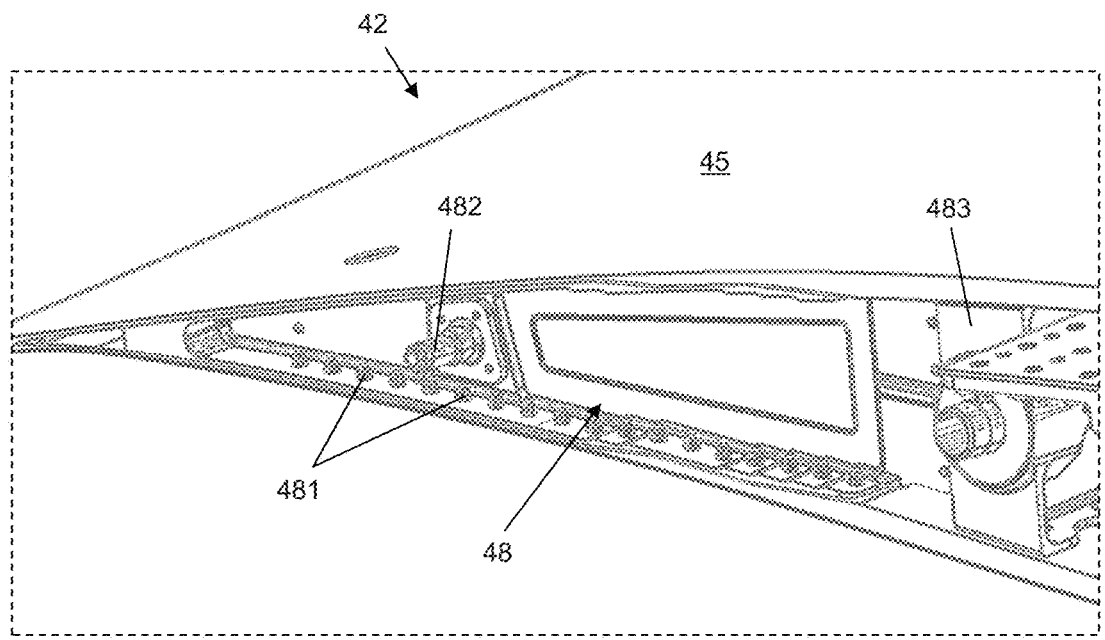
FIG. 4 is a partial perspective view of an example second part of a trailing edge aerodynamic structure.
Figure 5:
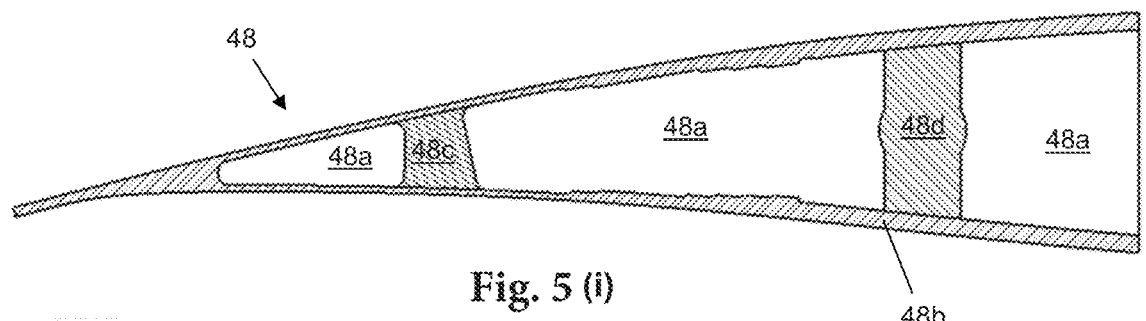
Figure 6:
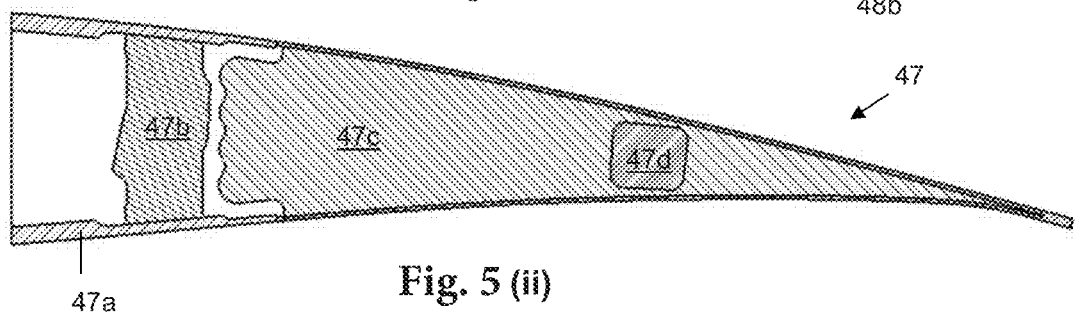
Figure 6:
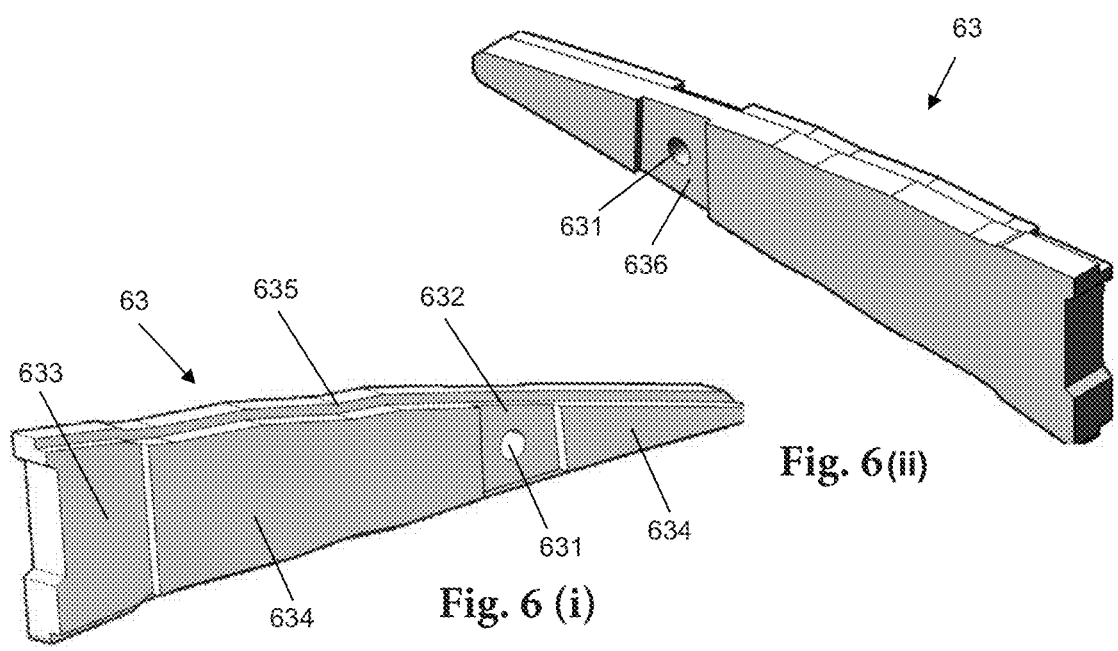

FIGS. 4 to 6 illustrate an example of the invention in which the aerodynamic structure is an aircraft wing, the first part is a trailing edge part of a wing tip, and the second part is a trailing edge part of a winglet. It should be noted that the term "winglet" as used in this specification is intended to refer to any type of wing tip aerofoil device, including but not limited to winglets, splines, wing tip fences or raked wing tips.

FIG. 4 shows the trailing edge part of an interface surface 48 of an example winglet 42, which is joinable to a wing tip (not shown) to form a wing having an aerodynamic surface 45. In the particular example, the size of the gap between the winglet 42 and the wing in the trailing edge region (at the aerodynamic surface) may be anywhere within a known range, due to assembly tolerances.

The interface surface 48 is formed by a closing rib (that is, the innermost rib) of the winglet 42, together with the end of the winglet spar and the edges of the winglet outer skin, and comprises various regions/features which are recessed or which protrude relative to immediately adjacent or surrounding regions (that is, local regions). For example the interface surface 48 comprises locally protruding features in the form of a spar end 481, a spigot 482, and the closing rib to the winglet covers, and a spar end 483. The main central region of the interface surface 48 may be considered to be locally recessed, as it is recessed relative to the edges of the winglet covers.

FIG. 5 shows a plan view of the interface surface 48 of the winglet 42 (in part (i)) and a plan view of a corresponding interface surface 47 of the wing tip to which the winglet 42 is to be joined (in part (ii)). The significant protruding and recessed features/regions of each interface surface 47, 48 are indicated on FIG. 5 as follows.

The unshaded part of the interface surface 48 is all recessed to the same depth relative to the edges 48b of the winglet covers. These edges 48b may be considered to represent a nominal surface of the interface surface 48, and define (together with the edges 47a of the wing tip covers) the size of the gap in the aerodynamic surface of the assembled wing between the wing tip and winglet 42 (that is, the gap which must be filled with sealant material). The interface surface 48 also comprises a trailing edge locally protruding region 48c (corresponding to the mounting feature for the spigot 482) and a leading edge locally protruding region 48d (corresponding to the spar end 483).

The interface surface 47 of the wing tip comprises the edges 47a of the wing covers, which may be considered to represent a nominal surface of the interface surface 47. The central region 47c is recessed by a first amount relative to the cover edges 47a. The region 47b protrudes relative to the central region 47c, but is recessed relative to the cover edges (by a second amount smaller than the first amount). The region 47d protrudes relative to the central region 47c and relative to the cover edges 47a.

FIG. 6 shows an example trailing edge support material structure 63, for use in sealing a gap between the trailing edge parts of the example winglet 42 and the example wing tip of FIGS. 4 and 5. Part (i) shows the outboard surface of the support material structure, and part (ii) shows the inboard surface.

The example trailing edge support material structure 63 comprises a single piece of open-cell foam (which may have any of the features of the open-cell foams discussed in relation to FIG. 2) cut to the profile shown in FIG. 6. In particular, the trailing edge support material structure 63 has a relatively larger thickness for most of its area such as in middle and end sections 634, but has several thinner sections. In particular, the outboard surface has a leading edge recessed region 633, a trailing edge recessed region 632, and a peripheral recessed region 635, whilst the inboard surface has a trailing edge recessed region 636 corresponding to the location of the trailing edge recessed region 632 on the outboard surface. Additionally the trailing edge support material structure 63 comprises a hole 631 extending between the inboard and outboard surfaces. The hole 631 accommodates the spigot 482 which links the trailing edge of the winglet to trailing edge of the wing tip. The thickness of the thicker region of the trailing edge foam piece is configured to fill the maximum void expected to be present between the interface surfaces 48, 47 of the winglet and the wing tip, accounting for assembly tolerances. In the particular example, the thicker region is 45 mm thick. The shape, size and thickness of the thinner sections is configured to accommodate the locally protruding features on the winglet and wing tip interface surfaces 48, 47.

The configuration of the outboard surface of the trailing edge support material structure 63 is such that an interference fit can be created between one or more of the surface features of the support material structure 63 and one or more corresponding surface features of the winglet interface surface 48. Preferably, the interference fit so achieved is able to hold the trailing edge support material structure 63 in place on the winglet 42 without the use of any other retaining mechanism. In a particular example, the fasteners 481 on the winglet closing rib grip the trailing edge support material structure 63 to hold it in position.

The cross-section of the trailing edge support material structure 63 is substantially the same shape as the interface surfaces 48, 47 of the trailing edge parts of the winglet 42 and wing tip (which are substantially equal in shape and size), but is smaller. This creates a region of the gap between the winglet 42 and the wing tip (specifically an outermost region immediately adjacent the aerodynamic surfaces of the winglet and the wingtip) in which the foam support material is not present. This outermost region of the gap will be entirely filled by sealant material in the fully assembled wing. The depth of the outermost region may be in the region of 3-20 mm. In the illustrated example the depth of the outermost region is 8 mm.

Figure 9I:
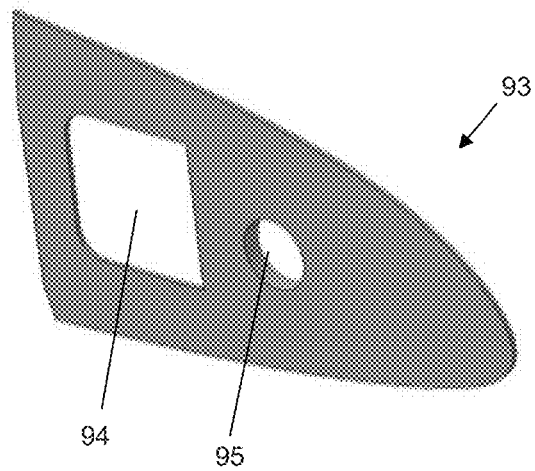
FIGS. 9(i) and 9(ii) show schematic perspective views, from the inboard and outboard sides, of an example support material for the aerodynamic structure of FIGS. 7 and 8.
Figure 9:
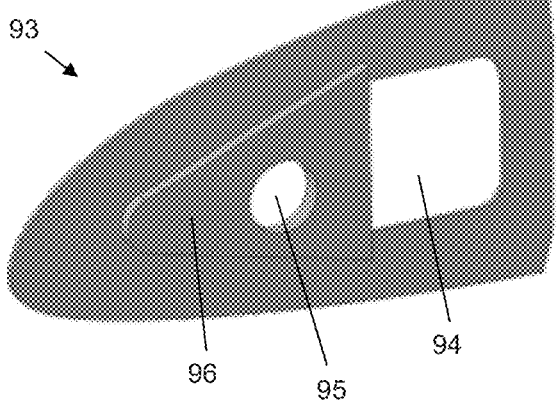

FIGS. 7 to 9 illustrate an example of the invention in which the aerodynamic structure is an aircraft wing, the first part is a leading edge part of a wing tip, and the second part is a leading edge part of a winglet.

FIG. 7 shows the leading edge part of an interface surface 78 of an example winglet 72, which is joinable to a wing tip (not shown) to form a wing having an aerodynamic surface 75. In the particular example, the size of the gap between the winglet 42 and the wing in the trailing edge region (at the aerodynamic surface) may be anywhere within a known range, due to assembly tolerances.

The interface surface 78 is formed by a closing rib of the winglet 72 (that is the innermost rib) of the winglet, together with the edges of the winglet outer skin (or covers), and comprises various regions/features which are recessed or which protrude relative to immediately adjacent or surrounding regions (that is, local regions). For example the interface surface 78 comprises locally protruding features in the form of a spigot 782, a spar end 783, and the closing rib 781. The regions between these features open into an internal space within the winglet structure. These regions may be considered to be locally recessed. It should be noted that the spar end 783 is locally protruding relative to the surrounding open regions, but is recessed relative to the edges of the winglet covers and relative to the closing rib 781. Similarly, the closing rib 781 is locally protruding relative to the adjacent open region, but is substantially flush with the edges of the winglet covers.

FIG. 8 shows a plan view of the interface surface 78 of the winglet 42 (in part (i)) and a plan view of a corresponding interface surface 77 of the wing tip to which the winglet 72 is to be joined (in part (ii)). The significant protruding and recessed features/regions of each interface surface 77, 78 are indicated on FIG. 5 as follows.

The unshaded parts of the interface surface 78 open into the internal space of the winglet, and may therefore be considered as recessed regions of the interface surface 78. The edges 78a of the winglet covers may be considered to represent a nominal surface of the interface surface 48, and define (together with the edges 77a of the wing tip covers) the size of the gap in the aerodynamic surface 75 of the assembled wing between the wing tip and winglet 42 (that is, the gap which must be filled with sealant material). The region 78b of the interface surface 78, which corresponds to the closing rib 781, is substantially flush with the cover edges 78a. The interface surface 78 also comprises a region 78c corresponding to the spar end 783, which is recessed relative to the cover edges 78a, but may be considered locally protruding relative to the immediately adjacent open (unshaded) regions. The region 78c encompasses a subregion 78d (corresponding to the spigot 782) which protrudes relative to all other parts of the interface surface 78.

The interface surface 77 of the wing tip comprises the edges 77a of the wing covers, which may be considered to represent a nominal surface of the interface surface 77. The unshaded central regions open into the internal space of the wing tip, and may therefore be considered as recessed regions of the interface surface 77. The region 77b of the interface surface 77, which corresponds to an outermost rib of the wing tip, is substantially flush with the cover edges 77a. The region 77c, which corresponds to the end of a front spar of the wing tip, is recessed relative to the cover edges 78a, but may be considered locally protruding relative to the immediately adjacent open (unshaded) regions.

FIG. 9 shows an example leading edge support material structure 93, for use in sealing a gap between the leading edge parts of the example winglet 72 and the example wing tip of FIGS. 7 and 8. Part (i) shows the inboard surface of the support material structure 93, and part (ii) shows the outboard surface.

The example leading edge support material structure 93 comprises a single piece of open-cell foam (which may have any of the features of the open-cell foams discussed in relation to FIG. 2) cut to the profile shown in FIG. 9. In particular, the leading edge support material structure 93 has a relatively smaller thickness for most of its area, but has a thicker section 96 which projects out from the outboard surface. Additionally the leading edge support material structure 93 comprises two holes 94, 95 extending between the inboard and outboard surfaces. The rearward, larger hole 94 accommodates the spigot 782 and related support structure, whilst the frontward smaller hole 95 is to enable system cables to pass through the support material structure.

The shape and size of the thicker section 96 corresponds to the shape and size of a recessed (open) region of the winglet leading edge interface surface 78. The thicker region may be slightly larger than the corresponding recessed region, so that an interference fit can be created by pressing the thicker section into the corresponding recessed region. The thickness of the thinner region of the leading edge support material structure 93 is substantially equal to the maximum gap expected to be present between the interface surfaces 78, 77 of the winglet 72 and the wing tip, due to assembly tolerances. In the particular example, the thinner region is 6 mm thick. The thickness of the thicker region is configured to be receivable within the opening in the winglet interface surface 78, and is sufficiently thick that friction between the edges of the thicker region and the opening can hold the leading edge support material structure 93 in place on the winglet interface surface 78 without the use of any other retaining mechanism.

The cross-section of the leading edge support material structure 93 is substantially the same shape as the leading edge interface surfaces 78, 77 of the winglet and wing tip (which are substantially equal in shape and size), but is smaller. This creates a region of the gap between the winglet 72 and the wing tip (specifically an outermost region immediately adjacent the aerodynamic surfaces of the winglet and the wingtip) in which the support material is not present. This outermost region of the gap will be entirely filled by sealant material in the fully assembled wing. The depth of the outer most region may be in the region of 3-20 mm. In the illustrated example the depth of the outermost region is 8 mm.

Figure 10A:
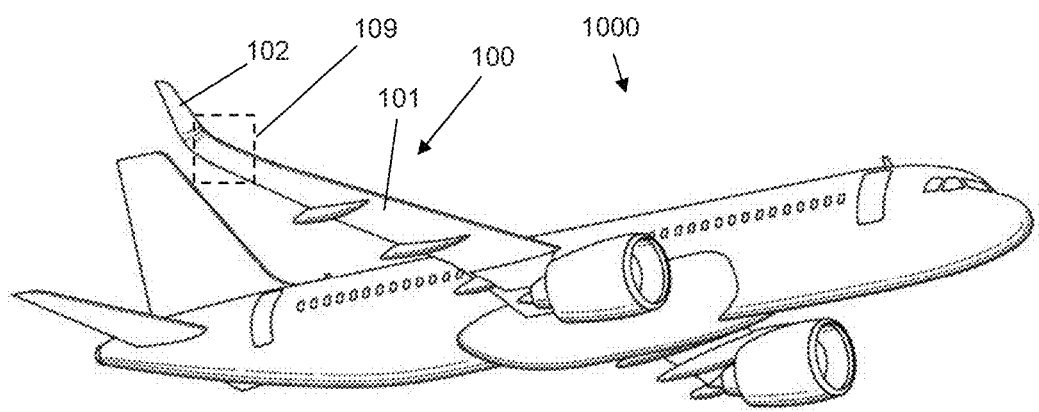
FIG. 10a is a schematic view of an example aircraft comprising an aerodynamic structure according to the invention.

FIG. 10a shows an example aircraft 1000 comprising an aerodynamic structure according to the invention. The aerodynamic structure may have any of the features of the example aerodynamic structures described above. In some examples the aircraft 1000 may comprise several aerodynamic structures according to the invention, which may include one or more wings, one or more horizontal stabilizers, one or more nacelles, the vertical stabilizer, or any other aerodynamic structure. The aircraft 1000 comprises two wings 100, each of which has a main wing part 101, and a winglet 102 attached to the tip of the main wing part 101. A joint between the wing tip and the winglet 102 is located in the region 109. Although only the starboard wing is visible in FIG. 10a, the same features are present on the port wing.

Figure 10B:
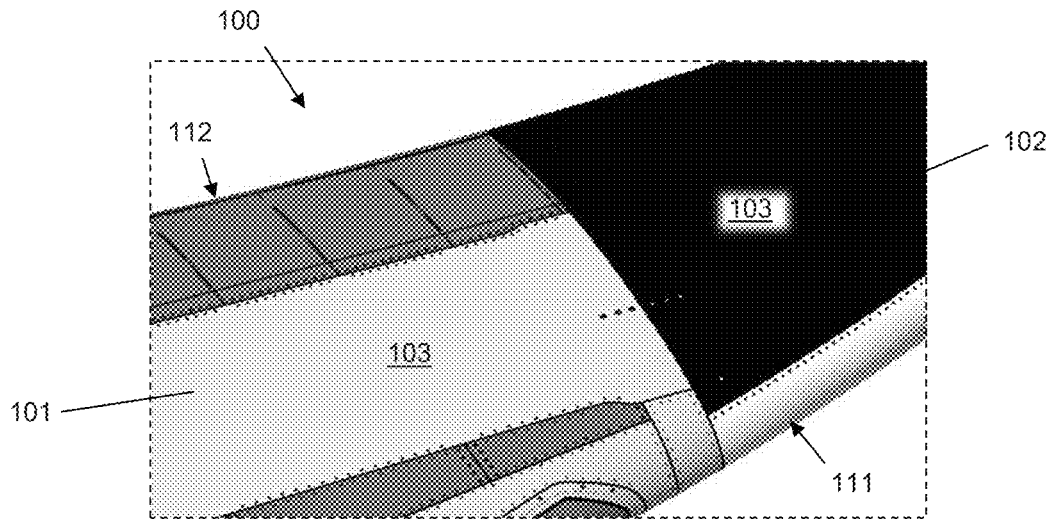
FIG. 10b is a perspective view of an example aerodynamic structure for the aircraft of FIG. 10a, and FIG. 11 is a flow chart illustrating an example method of manufacturing an aerodynamic structure according to the invention.

FIG. 10b shows an example of such a join in more detail. In particular, FIG. 10b shows a section of an aircraft wing 100 which includes an inboard part of a winglet 102, and a wing tip 103. The wing 100 is an aerodynamic structure. The wing tip 101 and winglet 102 are respectively first and second parts. The wing tip 101 and winglet 102 each form part of an aerodynamic surface 103 of the wing 100. The wing tip 101 and winglet 102 comprise adjacent sections of the aircraft wing. The wing tip 101 and winglet 102 each have a trailing edge 112 and a leading edge 111. Between the wing tip 101 and winglet 102 there is a gap, which contains sealant support material and sealant material, which may be arranged in any of the manners, and/or have any of the features, described above in reference to FIGS. 1 to 9. In some examples the support material is present on a leading edge region and on a trailing edge region of each interface surface, but is not present on a region between the leading edge region and the trailing edge region. In other examples the support material is present on or adjacent the whole periphery of each interface region.

Figure 11:
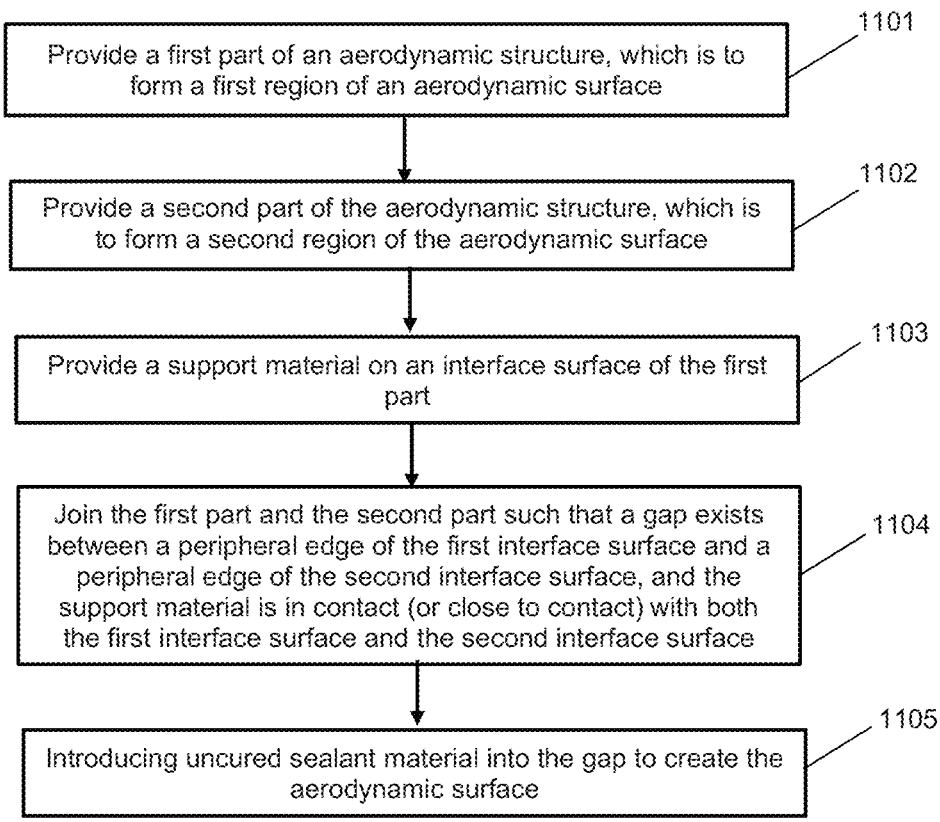

FIG. 11 is a flow chart illustrating a method of manufacturing an aerodynamic structure comprising an aerodynamic surface. The aerodynamic structure may be an aerodynamic structure according to any of the examples described above. For example, it may be an aircraft wing, or other aerodynamic structure of an aircraft. It may comprise a winglet joined to a wing tip.

The method comprises, in a first block 1101, providing a first part of the aerodynamic structure, which is to form a first region of the aerodynamic surface. The first part may be a first part according to any of the examples described above. In a particular example the first part may be a winglet. Providing the first part may comprise arranging the first part in a particular position and/or orientation. The first part may, for example, be supported on a jig. The first part may already be joined to further parts of the aerodynamic structure, or of a final product of which the aerodynamic structure is a part, during performance of block 1101.

In a second block 1102, a second part of the aerodynamic structure is provided. The second part is to form a second region of the aerodynamic surface. The second part may be a second part according to any of the examples described above. In a particular example the second part may be a wing tip. Providing the second part may comprise arrange the second part in a particular position and/or orientation. The second part may, for example, be supported on a jig. The second part may already be joined to further parts of the aerodynamic structure, or of a final product of which the aerodynamic structure is a part, during performance of block 1102.

A third block 1103 of the method comprises providing a support material on an interface surface of the first part which is configured to be positioned adjacent to a corresponding interface surface of the second part, and/or providing a support material on an interface surface of the second part which is configured to be positioned adjacent to a corresponding interface surface of the first part. The support material may be a support material according to any of the examples described above. The support material may be provided as a support material structure, such as the foam support material structures shown in FIGS. 6 and 9. Providing the support material on an interface surface may comprise attaching the support material to the interface surface, by any suitable mechanism. In examples in which the support material is compressible, preferably the attachment mechanism does not affect the compressibility of the support material. In some examples providing the support material on the interface surface comprises creating an interference fit between a feature of the support material and a feature of the interface surface. Alternatively or additionally, an adhesive/sealant may be used to attach the support material to the interface surface. In some examples one or more retaining features (such as one or more hooks, ledges, recesses, protrusions or the like) may be present on the interface surface, to engage with and retain the support material, in which case providing the support material on the interface surface may comprise engaging the support material with the one or more retaining features.

In block 1104, the first part and the second part are joined such that a gap exists between a peripheral edge of the first interface surface and a peripheral edge of the second interface surface, and the support material is in contact with (or is close to being in contact with/nearly in contact with) both the first interface surface and the second interface surface. The gap may have any of the features described above in relation to the examples of FIGS. 1 to 10*b*. Joining of the first part and the second part may be performed in any suitable manner, and will depend on the nature of the first part and the second part. For example, the first part and the second part may be joined using fasteners, adhesive, interlocking structures, hinges, or the like. Joining the first part and the second part may comprise fixedly attaching the second part to the first part, or vice versa. A load-transmitting connection may be created between the first part and the second part by the joining. Joining the first part and the second part may comprise engaging a connector structure (such as a spigot) on the first part with a corresponding connector structure (such as a socket) on the second part. Joining the first part and the second part may comprise aligning an aerodynamic surface of the first part with an aerodynamic surface of the second part.

Joining the first part and the second part may comprise ensuring that the width of the gap is within a predetermined range. The width of the gap may be determined as a result of the joining mechanism (e.g. due to the size and configuration of connector structures used to effect the joining). In some examples the joining process may be alterable to control the width of the gap.

Performing block 1104 may comprise compressing part or all of the support material. Where the aerodynamic structure is an aerofoil, the support material may be compressed in a spanwise direction of the aerofoil (relative to a nominal thickness of the support material when no external forces are applied). The degree to which the support material is compressed will depend on the width of the gap. In general, the degree of the compression will depend on the manufacturing and assembly tolerances for the specific application. For a winglet to wing tip join, the peripheral region of the support material may be compressed by an amount in the range 0.5-10 mm. Some parts of the support material may be compressed to a greater degree than other parts. Some degree of compression of the support material can be advantageous, since it ensures that the support material is in contact with both of the first and second interface surfaces. However, provided that the support material is in contact with both of the first and second interface surfaces, at least adjacent an outermost edge region of the support material (the outermost edge of the support material being the edge closest to the aerodynamic surface), compression of the support material is not essential.

In block 1105, uncured sealant material into is introduced into the gap to create the aerodynamic surface. The sealant material may be a sealant material according to any of the examples described above. The uncured sealant material may be in a relatively liquid state, such that it can flow into the gap. The uncured sealant material may be introduced into the gap by any suitable mechanism, such as injection. Introducing the uncured sealant material may comprise smoothing the outer surface of the uncured sealant material, to a desired degree, to create the aerodynamic surface. Penetration of the uncured sealant material into the gap is limited or constrained by the support material, which contacts both interface surfaces and therefore effectively blocks the gap (the support material may be considered to form a lower surface or floor within the gap. In some examples the uncured sealant material penetrates the structure of the support material before filling the outermost region of the gap in which no support material is present. For example, where the support material is an open-cell foam material, some of the sealant material may impregnate the outer cells of the foam. This penetration may advantageously enhance the adherence of the support material to the aerodynamic structure.

Further to performing block 1105, the uncured sealant material may be cured, by any suitable mechanism, to form the completed aerodynamic structure.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aerodynamic structure including an aerodynamic surface, wherein the aerodynamic surface is an outermost surface of the aerodynamic structure and the aerodynamic surface comprises:

a first part of the aerodynamic structure;
a second part of the aerodynamic structure; and
a sealed gap between the first part and the second part;
wherein the sealed gap is sealed with a sealant material and a compressible support material;
wherein the gap contains the sealant material and the compressible support material;
wherein the gap is arranged such that an outermost part of the gap immediately adjacent the aerodynamic surface contains only the sealant material and an inner part of the gap, which is relatively further from the aerodynamic surface than the outermost part, contains only the support material;
wherein the sealant material is adjacent the compressible support material in the gap; and
wherein the sealant material is a curable material configured to be applied to the aerodynamic structure in a fluid state and subsequently cured into a solid state.

2. The aerodynamic structure according to claim 1, wherein the support material comprises an open-cell foam.

3. The aerodynamic structure according to claim 1 wherein the gap is defined by a first interface surface on the first part and a second interface surface on the second part, each of the first interface surface and the second interface surface is perpendicular to the aerodynamic surface.

4. The aerodynamic structure according to claim 3, wherein at least one of the first interface surface and the second interface surface comprises a recess.

5. The aerodynamic structure according to claim 3, wherein the aerodynamic surface forms a closed loop, and each of the first and second interface surfaces is a cross section of the closed loop.

6. The aerodynamic structure according to claim 5, wherein the support material is present on a first peripheral region of the first interface surface adjacent the first part of the aerodynamic surface and a second peripheral region of the second interface adjacent the second part of the aerodynamic surface, and the support material is not present on a central region of each of the first and second interface surfaces.

7. The aerodynamic structure according to claim 5, where the support material is present on a leading edge region and on a trailing edge region of each of the first and second interface surfaces, and is absent from a region between the leading edge region and the trailing edge region.

8. The aerodynamic structure according to claim 3, wherein at least one of the first interface surface and the second interface surface comprises a projection, and wherein the support material comprises a hole, recess, or compressible region configured to accommodate the projection.

9. The aerodynamic structure according to claim 3, wherein one of the first interface surface and the second interface surface comprises a formation extending into or out of the interface surface, and wherein the support material is configured to engage the formation such that an interference fit is created between the support material and the formation.

10. The aerodynamic structure according to claim 1, wherein an intermediate part of the gap is disposed between the outermost part and the inner part, and the intermediate part contains the sealant material and the support material.

11. The aerodynamic structure according to claim 1, wherein the support material is sufficiently stiff to block flow of the sealant material in the fluid state.

12. The aerodynamic structure according to claim 1, wherein the structure comprises an aerofoil and the first and second parts comprise adjacent sections of the aerofoil.

13. The aerodynamic structure according to claim 1, wherein the structure comprises an aircraft wing, one of the first and second parts comprises a tip part of the wing, and the other of the first and second parts comprises a winglet.

14. An aircraft comprising an aerodynamic structure according to claim 1.

15. An aerodynamic structure comprising:
a first part of the aerodynamic structure, wherein the first part has an aerodynamic outer surface forming an outermost surface of the aerodynamic structure;
a second part of the aerodynamic structure, wherein the second part has an aerodynamic outer surface configured to be aligned with the aerodynamic outer surface of the first part; and
a gap formed by and existing between the first part and the second part, wherein the gap has an outer region extending from the aerodynamic outer surfaces of the first and second parts deeper into the gap, and the gap as an inner region inward of the outer region;
a sealant material spanning the gap and having an aerodynamic outer surface aligned with the aerodynamic outer surfaces of the first and second parts,
wherein the sealant material, while in the gap, is in a fluid state and in a solid state;
wherein the sealant material, while in the gap, is cured to transition from the fluid state to the solid state; and
wherein the sealant material entirely fills the outer region of the gap such that the outer region only contains the sealant material; and
a compressible support material spanning the gap, adjacent the sealant material and entirely filling the inner region of the gap such that the inner region only contains the compressible support material.

16. The aerodynamic structure of claim 15, wherein the outer region forms a closed loop enclosing the inner region, and the sealant material is arranged around a peripheral edge of the collapsible support material.

17. The aerodynamic structure of claim 15, wherein the gap is between a first interface surface on the first part and a second interface surface on the second part, and each of the first and second interface surfaces forms a closed loop, wherein the support material is on a first peripheral region of the first interface surface adjacent the first part of the aerodynamic surface and on a second peripheral region of the second interface adjacent the second part of the aerodynamic surface, and the support material is absent from a central region of each of the first and second interface surfaces.

18. A method to form a seal in an aerodynamic structure, wherein the aerodynamic structure includes:
a first part including a first aerodynamic outer surface forming a first outermost surface of the aerodynamic structure;
a second part including a second aerodynamic outer surface forming a second outermost surface of the aerodynamic outer surface, and aligned with the first aerodynamic outer surface of the first part; and
a gap formed by and existing between the first part and the second part, wherein the gap has an outer region extending from the first and second aerodynamic outer surfaces deeper into the gap, and the gap has an inner region inward of the outer region;

the method comprising:
> inserting a support material into the gap and positioning the support material at the inner region of the gap to entirely fill the inner region, wherein the support material is entirely inward of the outer region of the gap;
>
> filling the outer region of the gap with a sealant material in a fluid state, wherein the sealant material, while in the fluid state, is adjacent the support material and is prevented by the support material from flowing entirely through and out of the gap; and
>
> curing the sealant material while in the gap to transition the fluid state of the sealant material to a solid state, wherein the sealant material while in the solid state forms a third outer aerodynamic surface aligned with the first and second outer aerodynamic surfaces of the first and second parts.

19. The method according to claim 18, wherein the support material limits the penetration of the sealant material into the gap during the step of filling the outer region of the gap with the sealant in the fluid state.

20. The method according to claim 18, further comprising the sealant material in the fluid state penetrating the support material positioned at the inner region of the gap.

\* \* \* \* \*